Figure 1A:
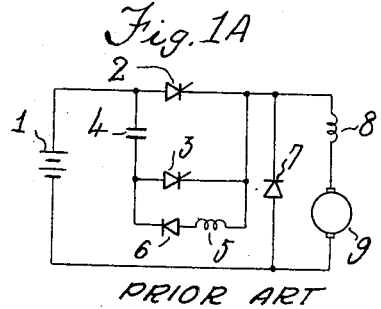

United States Patent

[11] 3,594,629

[72] Inventors Chuji Kawakami;
 Ichiro Kouzuma, both of Tokyo, Japan
[21] Appl. No. 881,517
[22] Filed Dec. 2, 1969
[45] Patented July 20, 1971
[73] Assignee Kabushiki Kaisha Meidensha
 Tokyo, Japan
[32] Priority Dec. 9, 1968
[33] Japan
[31] 43/90438

[54] POWER REGENERATION SYSTEM FOR CHOPPER CIRCUITS
5 Claims, 4 Drawing Figs.

[52] U.S. Cl................................................. 321/2,
 318/341, 318/345, 321/44, 321/45 C, 323/18,
 323/22 SC
[51] Int. Cl...................................................... H02m 3/32,
 H02p 7/28, G05f 1/00

[50] Field of Search......................................... 321/2, 43,
 44, 45, 45 C, 45 ER; 307/240, 255; 323/22 SC, 18;
 318/341, 345

[56] References Cited
UNITED STATES PATENTS

| | | | |
|---|---|---|---|
| 3,303,416 | 2/1967 | Paice et al. ................. | 323/22 |
| 3,372,327 | 3/1968 | Morgan ...................... | 321/44 X |
| 3,372,329 | 3/1968 | Steimel et al. .............. | 321/45 X |
| 3,396,293 | 8/1968 | Harris......................... | 321/2 UX |
| 3,517,290 | 6/1970 | Gunsser...................... | 318/341 X |

Primary Examiner—William H. Beha, Jr.
Attorney—Kelman and Berman

ABSTRACT: The conventional use of an electromechanical switching device in a DC-DC chopping circuit is avoided by a chopper circuit including a main switching device and first and second auxiliary switching devices for controlling the main switching device and for providing charging and discharging paths for the commutation capacitor.

INVENTORS.
CHUJI KAWAKAMI; ICHIRO KOUZUMA
BY: Kelman and Berman
AGENTS.

POWER REGENERATION SYSTEM FOR CHOPPER CIRCUITS

This invention relates to chopper circuits, and particularly to a chopper circuit, preferably employing solid state devices, in which the power supplied to a load may be adjusted over a wide range.

Known chopper circuits for supplying a variable amount of power from a direct current source to a load do not permit power to be returned directly from the load to the source because of the circuitry required to provide the power adjusting feature. Thus, it has been necessary heretofore to connect such a chopper circuit with a second circuit which provides the necessary power return. The known arrangement has required the use of electromechanical switches having movable contacts for connecting and disconnecting the chopper circuit and the return circuit. Because of contact wear, the performance of such arrangements is poor, and their service lift is short.

It is the primary object of this invention to provide a chopper circuit including a return circuit which permits the switching of power supplied from a direct current source to a load, and power return from the load to the source, by electronic switching means without the use of electromechanical switches.

Another object of the invention is the provision of a chopper circuit which has no mechanical contacts, and which is reliable in performance, is easy to operate, and has a long service life.

Figure 1B:
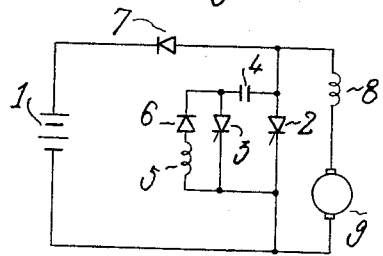
Figure 1C:
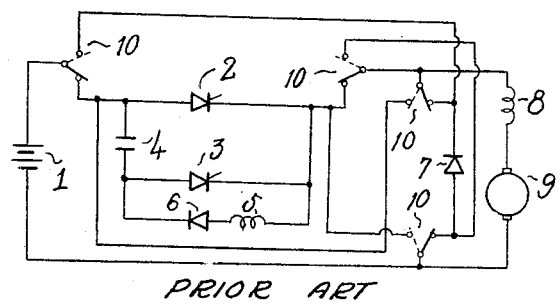
Figure 2:
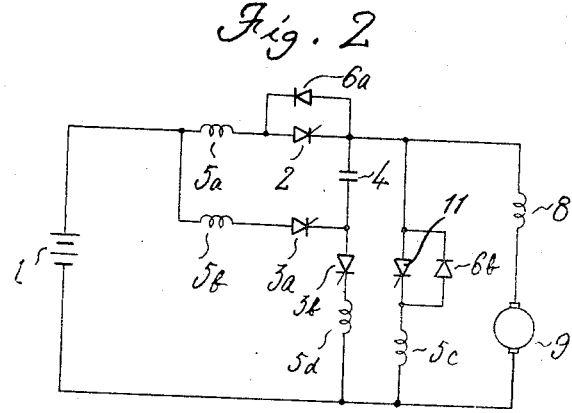

Additional objects, features, and advantages of this invention will become evident from the following description of a preferred embodiment when considered in conjunction with the accompanying drawing in which:

FIG. 1A is a diagram of a known circuit for supplying power from a direct-current source to a load;

FIG. 1B similarly shows a known circuit for returning power from the load to the source;

FIG. 1C illustrates a known circuit for providing both power supply and power return; and FIG. 2 is a circuit diagram of a chopper circuit according to this invention.

The chopper circuit of the prior art illustrated in FIG. 1A supplies power of any desired value from a direct-current power source 1 and a main thyristor 2 to a load 9 which may be an electric motor. The circuit further includes an auxiliary thyristor 3 which aids in turning the main thyristor 2 on and off, and a commutation capacitor 4 for inversely biasing the thyristor 2, 3 by the charge voltage developed across the capacitor to turn the thyristors off. A commutation reactor 5 forms a resonant circuit with a capacitor 4. A commutation diode 7 aids in turning the thyristors off. A smoothing diode 7 reduces the fluctuations of the current passed to the load 9 and to a direct-current reactor 8 for temporarily storing energy from the load.

The circuit shown in FIG. 1A operates as follows:

When the auxiliary thyristor 3 is turned on by a gate control circuit (not shown), the capacitor 4 is charged by current supplied by the power source 1 through the thyristor 3, reactor 8, and load 9 so that the anode side of the main thyristor 2 becomes positive. When the latter is turned on by the nonillustrated gate control circuit, the capacitor 4 is discharged through the main thyristor 2, reactor 5, and diode 6 simultaneously with the supply of power form the source 1 to the load 9 through the reactor 8. As soon as the capacitor 4 is discharged, the capacitor is recharged in such a manner that the anode side of the auxiliary thyristor becomes positive. The recharging voltage is higher than the previous charging voltage, and the auxiliary thyristor 3 is inversely biased and turned off by a transient voltage which is produced by resonance of the capacitor 4 and the reactor 5 during the recharging period of the capacitor. When the auxiliary thyristor 3 is turned on thereafter by the nonillustrated gate control circuit, the capacitor 4 is discharged through the auxiliary thyristor 3, reactor 8, and load 9. During discharge of the capacitor 4, the main thyristor 2 is inversely biased and turned off by the charge voltage of the capacitor 4, whereby power to the load 9 is shut off. After being discharged, the capacitor 4 is recharged from the power source 1 through a path including the capacitor 4, the auxiliary thyristor 3, the reactor 8, and the load 9 in such a manner that the anode side of the thyristor 2 becomes positive, whereupon another cycle may start.

It is impossible to return power directly from the load 9 to the power source 1 in the circuit of FIG. 1A. It has been common practice prior to this invention to connect the power source 1 to a circuit as shown in FIG. 1B for effective power return. In this circuit, the main thyristor 2 is turned on by the gate control circuit so that the power of the load 9 is accumulated in the direct-current reactor 8 from which it is returned to the power source 1 through the smoothing diode 7 when the main thyristor 2 is turned off.

To combine the features of the circuits of FIGS. 1A and 1B, as is shown in FIG. 1C, the known system requires mechanically operated switches, such as the illustrated double-throw switches 10 or corresponding relay contacts, for disconnecting the power source from the circuit of FIG. 1A and connecting the same to the circuit of FIG. 1B. Wear of the contacts results in the disadvantages pointed out above.

The circuit of the invention shown in FIG. 2 has a main thyristor 2 whose anode side is connected to the positive terminal of the power source 1 in a first series circuit with a first commutation reactor 5a. The anode of a first auxiliary thyristor 3a is connected to the positive terminal of the power source in a second series circuit with a second commutation reactor 5b. A first commutation diode 6a is connected parallel to the main thyristor 2 with opposite polarity. A commutation capacitor 4 connects the ends of the two series circuits remote from the current source 1.

A second commutation diode 6b and a power return thyristor 11 are arranged in parallel circuit with opposite polarity, and in a second series circuit with a third commutation reactor 5c which connects the anode of the diode 6b to the negative terminal of the power source 1. The other end of the parallel circuit 6b, 11 is connected to the juncture of the capacitor 4 and the main thyristor 2 of the first series circuit. A third series circuit of a second auxiliary thyristor 3b and a fourth commutation reactor 5d connect the negative terminal of the power source 1 to the juncture of the capacitor 4 with the auxiliary thyristor 3a. The two terminals of the load 9 are connected respectively to the negative terminal of the power source 1 and, through a direct-current reactor 8, to the juncture of the capacitor 4 with the first and second series circuits.

The circuit of FIG. 2 is operated as follows:

When power is supplied form the source 1 to the load 9, the main thyristor 2 is turned on and off without turning the power return thyristor 11 on. When the main thyristor 2 and the second auxiliary thyristor 3b are simultaneously turned on by the gate control circuit (not shown), current passes from the source 1 to the load 9 through the reactor 5a, main thyristor 2, and reactor 8. At the same time, the capacitor 4 is charged a current supplied by the source 1 through a circuit which includes the reactor 5a, main thyristor 2, capacitor 4, thyristor 3b, and reactor 5b in such a manner that the cathode side of the main thyristor 2 becomes positive. The second auxiliary thyristor 3b is turned off when the direction of current flow is reversed by the resonance of the capacitor 4 and the reactors 5a and 5d respectively.

When the first auxiliary thyristor 3a is turned on thereafter by the gate control circuit (not shown), the capacitor 4 is discharged through a circuit including the diode 6a, the reactors 5a and 5b, and the auxiliary thyristor 3a. When the capacitor charge is dissipated, the capacitor 4 is recharged in such a manner that the cathode side of the thyristor 3a becomes positive. The recharge voltage of the capacitor 4 is higher than the voltage of the previous charge. The main thyristor 2 is inversely biased during the recharging and turned off by a transient voltage produced by resonance of the capacitor 4 and the reactors 5a, 5b. The auxiliary thyristor 3a is inversely biased by the high recharge voltage of the capacitor 4 and turned off when recharging of the capacitor is completed. When the second auxiliary thyristor 3b is turned on thereafter by the gate control circuit (not shown), the charge on the capacitor 4 is dissipated through a circuit which includes the thyristor 3b, the reactors 5d, 5c, and the diode 6b. After dissipation of the charge, the capacitor 4 is recharged in such a manner that the cathode side of the thyristor 2 becomes positive. The thyristor 3B is turned off by the resonance of the capacitor 4 and of the reactors 5d, 5c when the direction of current flow is reversed.

The cycle is repeated after the main thyristor 2 and auxiliary thyristor 3b are turned on by the nonillustrated gate control circuit. Direct current of a desired value is thus supplied to the load 9 by turning the thyristor 2 on and off in a controlled manner.

When power is to be returned from the load 115 to the source 1, the main thyristor 2 is turned on, and the power return thyristor 11 is turned on and off. When the thyristor 11 is turned on by gate control circuit (not shown) while the thyristors 2 and 3b are off, and the capacitor 4 is charged in such a manner that the cathode side of the thyristor 3a becomes positive, the power of the load 9 is stored in the direct current reactor 8. At the same time, the capacitor 4 is discharged through the thyristor 3b, the reactors 5d, 5c, and the diode 6b, and the power return thyristor 11 is inversely biased and turned off by a transient voltage produced by the resonance of the capacitor 4 and the reactors 5c, 5d. The thyristor 3b is turned off when the current flow is reversed, as described above. The power stored in the reactor 8 is returned to the source 1 through the diode 6a when the thyristor 11 is turned off.

The power return system of the invention thus permits power return from the load to the power source in a single circuit without switching from one circuit to the other. Thyristors are employed and switched electronically without the use of mechanical switches. The chopper circuit has a long service life, and is positive in its operation. The commutation capacitor is charged and discharged without the passage of charging current through the load so that the circuit may be operated without a connected load. The voltage rise resulting from turning the thyristors on and off in the specifically illustrated embodiment is reduced by the division of the commutation reactor into four elements.

We claim:

1. A power regeneration system for chopper circuits comprising at least one main thyristor with its anode being disposed on the positive side of a direct-current voltage, a first commutation reactor forming a first series circuit with at least one main thyristor, a first auxiliary thyristor with its anode being disposed on the positive side of said direct current voltage, a second commutation reactor forming a second series circuit with said first auxiliary thyristor, one end of each of said first and second series circuits being connected to the positive side of said direct-current voltage, a first commutation diode connected in parallel with said at least one main thyristor in such a manner that their polarity is reversed, at least one commutation capacitor connected between the other ends of said first and second series circuits, a second commutation diode with its anode being disposed on the negative side of said direct current voltage, at least one power regeneration thyristor connected to said second commutation diode to form a parallel circuit therewith in such a manner that their polarity is reversed, a third commutation reactor disposed between the negative side of said direct-current voltage and said parallel circuit which is also connected to one end of said at least one commutation capacitor on the main thyristor side, a second auxiliary thyristor with its cathode end being connected to the negative side of said direct-current voltage and its anode end being connected to the juncture of said at least one commutation capacitor and the cathode end of said first auxiliary thyristor, a fourth commutation reactor connected between the cathode of said second auxiliary thyristor and the negative side of said direct-current voltage and forming a third series circuit with said second auxiliary thyristor, said third series circuit being connected between said at least one commutation capacitor and the negative side of said direct-current voltage.

2. In a chopper circuit for supplying a variable amount of power from a direct current source to a load, said chopper circuit including a main switching device for supplying a controllable amount of power from said source to said load; a first auxiliary switching device connected across said main switching device to aid the switching thereof; a first commutation reactor; a commutation capacitor connected to said main and said first auxiliary switching devices; and a commutation diode connected across said main switching device, said first commutation reactor and said commutation capacitor forming a first portion of a first resonant circuit across said main switching device to switch said main switching device; a direct-current reactor serially connected with said load; a smoothing diode connected across said load and said direct-current reactor; and switching means for reversing the terminals of said smoothing diode to return power stored in said direct-current reactor to said source when said main switching device is nonconducting; the improvement which comprises:

a second auxiliary switching device connected between said first auxiliary switching device and said direct current source to discharge said commutation capacitor when both said main and said first auxiliary switching devices are nonconducting.

3. The chopper circuit according to claim 2, wherein said first commutation reactor is serially connected with said main switching device, and said switching means comprises a. a second commutation reactor serially connected with said first auxiliary switching device and forming a second portion of said first resonant circuit with said commutation capacitor across said main switching device; and b. a third commutation reactor serially connected with a power return device and forming a first portion of a second resonant circuit with said commutation capacitor across said load and said direct-current reactor, said second portion of the first resonant circuit effecting, with said first portion of the first resonant circuit, switching of said main device, and said second resonant circuit effecting switching of said second auxiliary switching device.

4. The chopper circuit according to claim 3 further comprising a fourth commutation reactor serially connected with said second auxiliary switching device and forming a second portion of said second resonant circuit across said main switching device, said first and second portions of said second resonant circuit together effecting switching of said second auxiliary device.

5. A chopper circuit for supplying a variable amount of power from a direct-current source to a load, which comprises:

a. a main switching device connected between said direct current source and said load to supply said power;

b. an oppositely poled first commutation diode connected in parallel across said main device to aid the switching thereof;

c. a first commutation reactor serially connected with the parallel connection of said main device and said first commutation diode;

d. a direct-current reactor serially connected to said load to store energy when said main switching device is nonconducting;

e. a commutation capacitor connected at one end of the juncture of said main switching device and said direct-current reactor and forming with said first commutation reactor a first portion of a resonant circuit to switch said main device;

f. a first auxiliary switching device serially connected with a second commutation reactor between the other end of said commutation capacitor and said source, said second commutation reactor forming with said commutation capacitor a second portion of said resonant circuit to switch said main device;

g. a power return device connected in parallel across said direct-current reactor and said load;

h. an oppositely poled second commutation diode connected in parallel with said power return device to provide a discharge path for said commutation capacitor;

i. a third commutation reactor serially connected with said power return device and forming a first portion of a second resonant circuit with said commutation capacitor;

k. a second auxiliary switching device connected between the juncture of said commutation capacitor and said first auxiliary switching device and said source to provide a charging path for said commutation capacitor; and l. a fourth commutation reactor serially connected with said second auxiliary switching device and forming a second portion of said second resonant circuit with said commutation capacitor, said first and second portions of said second resonant circuit cooperating to effect switching of said second auxiliary switching device.